UNITED STATES PATENT OFFICE.

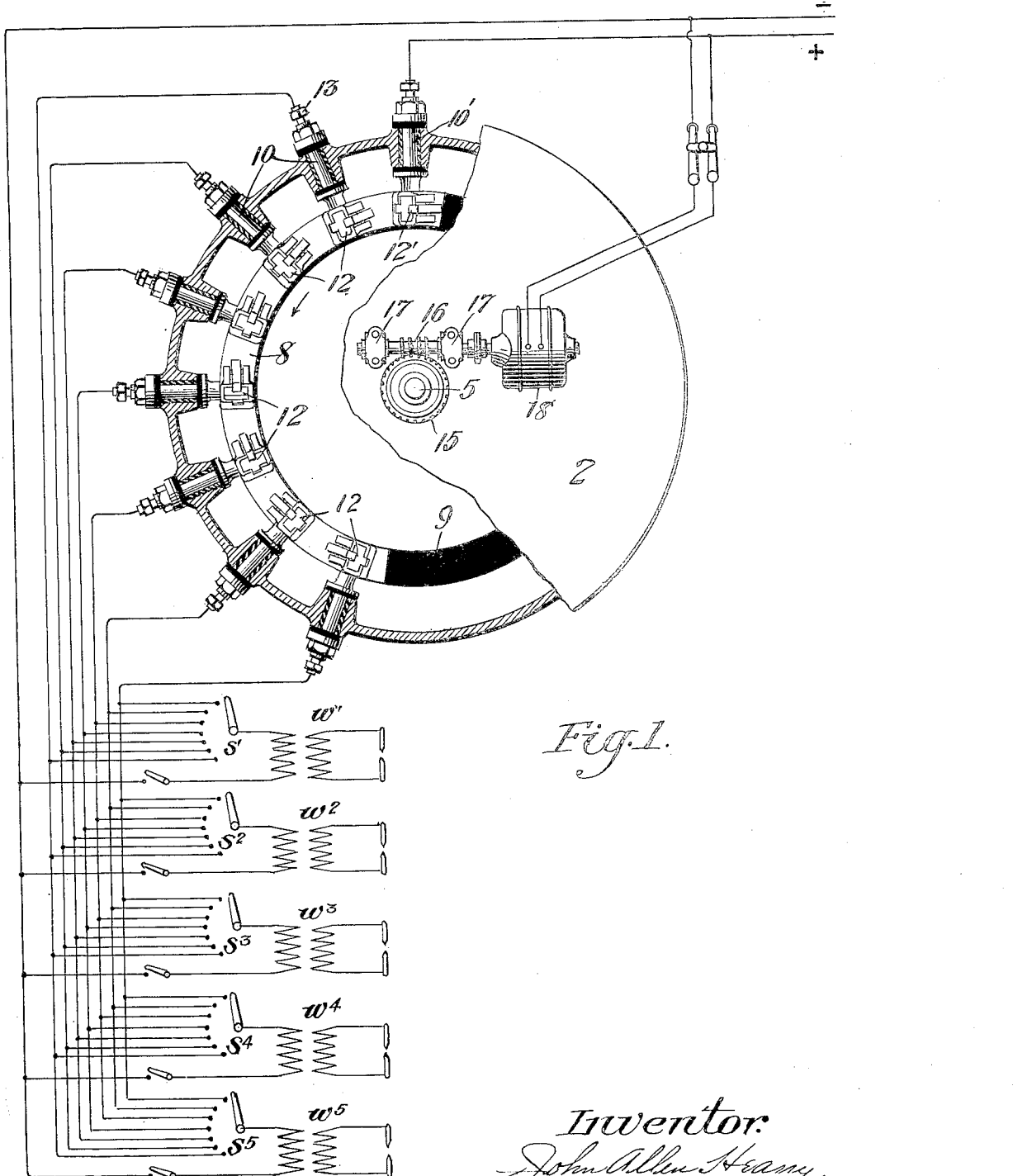

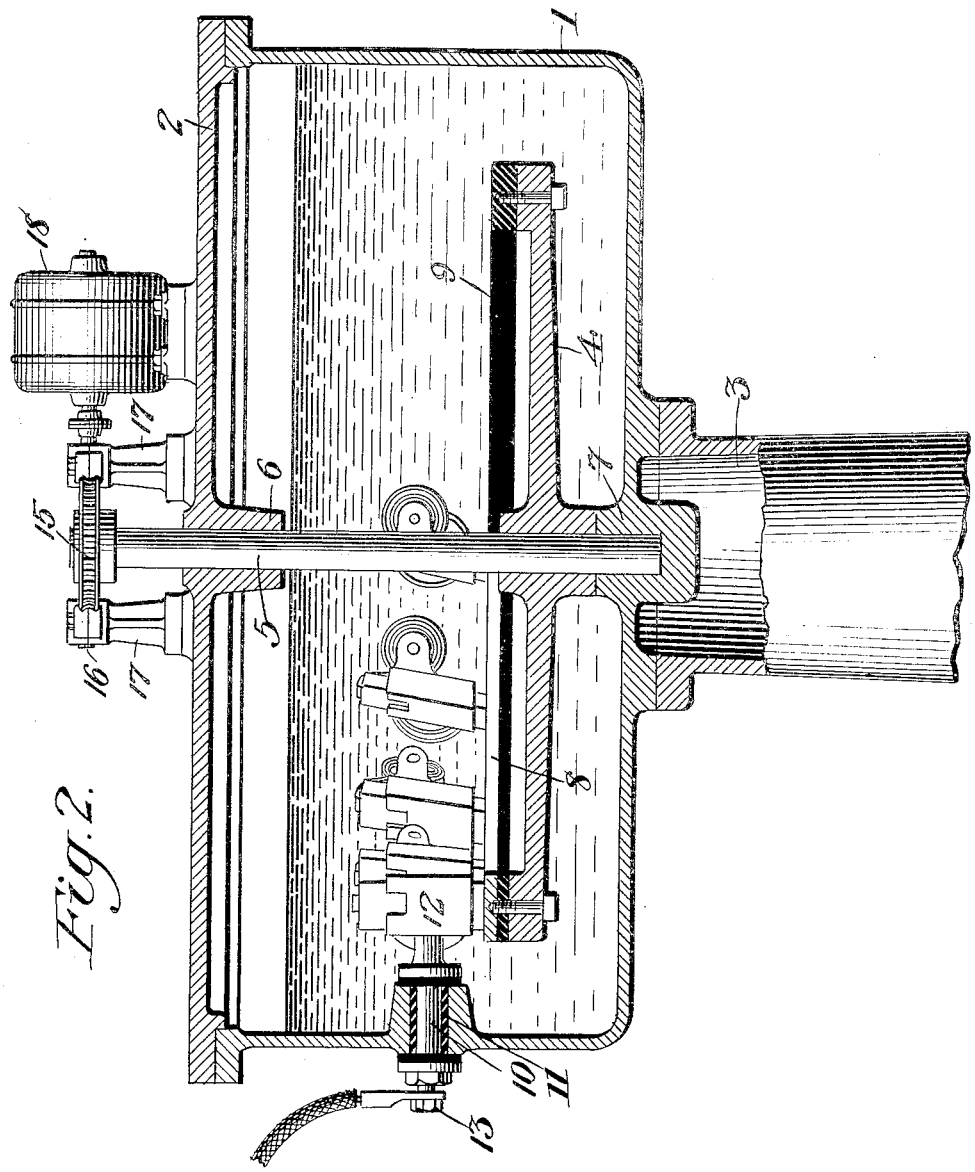

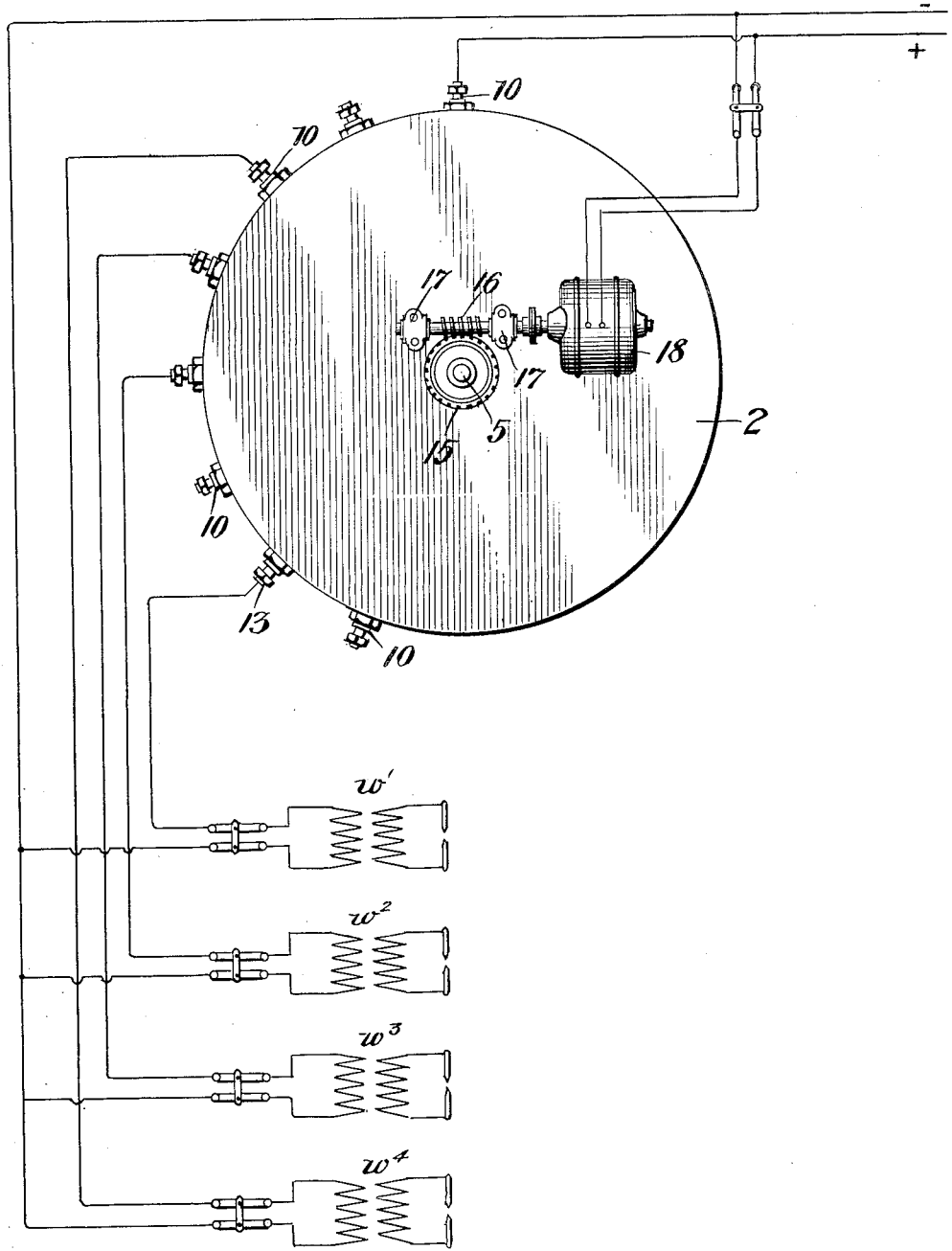

JOHN ALLEN HEANY, OF WASHINGTON, DISTRICT OF COLUMBIA.

TIMING APPARATUS FOR ELECTRIC WELDERS AND THE LIKE.

1,183,195.  Specification of Letters Patent.  Patented May 16, 1916.

Application filed March 2, 1914. Serial No. 822,102.

*To all whom it may concern:*

Be it known that I, JOHN ALLEN HEANY, a citizen of the United States, residing in the city of Washington, in the District of Columbia, have invented certain new and useful Improvements in Timing Apparatus for Electric Welders and the like; and I do hereby declare the following to be a full, clear, and exact description of the invention, such as will enable others skilled in the art to which it appertains to make and use the same.

The object of the invention is to provide timing mechanism for multiple electric welders and similar apparatus in which the duration of the current flowing between the electrodes of the welding apparatus may be accurately and selectively determined to meet the requirements of the work. It has been suggested heretofore to employ an adjustable timing apparatus with individual welders to regulate the period of current flow between the terminals of the welders, but inasmuch as the timing mechanism is intimately associated with the welding apparatus, it is usually necessary to suspend the operation of a given machine to change or adjust the timing mechanism to a different time interval of current flow.

In machine shops and plants employing a number of welding machines, each having individual timing apparatus requiring careful and accurate adjustment for each particular class of work done on such welder, the matter of such adjustment constitutes an important element in the economy and efficiency of the plant, both in the matter of time and in the uniformity of the products turned out by the welders.

The welding operation *per se* does not require highly skilled labor, so that a simple form of timing apparatus which may be quickly and accurately adjusted by the ordinary workman is obviously highly desirable. If this desirable characteristic is associated with an apparatus from and by which the time intervals of the flow of current to each of a number of welding machines may be selectively varied, the timing control of the entire welding plant consisting of many machines which may be operating at different periods of duration of current flow, will be reduced to its lowest terms and maximum efficiency.

The present invention is designed to present the foregoing desirable features, and to this end comprises a master timer for multiple electric welders and the like, comprising a contact device, preferably including a rotary contact segment with a series of brushes coöperating therewith to break the main circuit through the timer at successively varying time intervals, and means for connecting the respective welders to the master timer in any desired timed relation, exemplified by circuit connections between the individual welders and any selected brush or brushes of the timer to thereby regulate the duration of the current intervals at any or all of the welders.

The invention is illustrated in the accompanying drawings, in which:—

Figure 1 is a plan view of the apparatus showing the multiple welders and circuits in diagram, and the master timer partly in plan and partly in horizontal section; Fig. 2 is a vertical cross section through the master timer; and Fig. 3 illustrates an alternative form of circuit connections between the master timer and the various welders.

Referring to the drawings, 1 indicates a hollow bowl-shaped casing having a cover 2 and mounted upon a pedestal or support 3, located at any desired or convenient point in a shop or plant employing multiple welding machines of any of the approved types, and which are designed to be operated under regulable and predetermined time intervals of current flow, according to the particular character of the work being operated upon by the respective machines. Mounted upon a vertical shaft or spindle 5, journaled in bearings 6 and 7, carried by the cover and the bottom of the casing 1, respectively, is a disk 4, on the upper face of which is secured by bolts or other suitable fastening devices, a ring comprising a segment 8, preferably of copper or suitable electrical conductor, and a complementary segment 9 of insulation.

Mounted in suitable hollow bosses, disposed peripherally about the vertical walls of the casing, is a series of brush holding studs 10, which are insulated from the casing by bushings 11. On the inner end of each of the studs 10 is mounted a brush or contact device 12, including a holder and the usual carbon or similar brush proper, and each of the brushes is held with its lower face in contact with the ring consisting of the segments 8 and 9 carried by the rotating disk 4. The outer end of each of the studs 10 is provided with a binding post 13, or equivalent connection, by means of which the terminals of electric cables or conductors may be attached to the individual studs. The disk 4 is rotated at any predetermined or desired rate of speed by means of an electric motor 18, mounted on the cover 2 and connected with the shaft 5 by means of a worm shaft 16 coupled to the motor shaft and journaled in bearings 17, 17, said worm shaft engaging a worm wheel 15 keyed to the upper end of said shaft 5.

The casing is partially filled with oil or the like, so as to submerge the disk 4 and the brushes 12, and thereby prevent or reduce the heavy sparking which would otherwise occur at the instant of breaking contact between the brushes and the conductor segment 8.

In the preferred form of the apparatus shown in Fig. 1, the uppermost brush 12' is connected through its stud 10' with one of the main current leads. The other brushes 12 of the apparatus are connected to separate leads or conductors, each of which leads or conductors is tapped by a branch leading to the terminals of multiple point switches $s'$, $s^2$, $s^3$, etc., in circuit with the primaries of welders $w'$, $w^2$, $w^3$, etc., the secondaries of which welders are connected with the usual welding contacts. The other terminal of each primary welder winding is connected through a suitable hand switch to a lead connected with the common return to the opposite main or supply wire.

Assuming that the disk 4 is rotated in an anti-clockwise direction, as indicated by the arrow, Fig. 1, and that the parts occupy the relative positions indicated in Fig. 1, it will be seen that the path of the current from the positive lead will be by way of stud 10', brush 12' to conductor segment 8, thence through all of the brushes 12 and the leads connecting the respective brushes to the multiple point switches $s'$, $s^2$, etc. of the welders, through each of said switches which may be in operative position, through the primaries of the welder transformers to the common return leading to the negative side of the line. As soon as the segment 8 has passed from under brush 12', the circuit to all of the welders is broken. As the disk 4 continues its rotation and the forward end of the segment 8 passes into engagement with brush 12', and then passes successively under the remaining brushes 12, it will be apparent that the branch circuits connecting each of the brushes 12 with each of the welders will be successively closed at the brushes. It will also be apparent that the circuit closed through segment 8 between brush 12' and the next brush 12 to the left thereof, will be closed for a longer period than the circuits from brush 12' to any of the other series of brushes 12, and that the length of time during which these several circuits are maintained closed varies successively and, preferably, regularly. In other words, the first brush 12 to the left of brush 12' will maintain a circuit to the welders for a maximum time, the second brush for a shorter time, and the last brush 12 will maintain the circuit for the shortest time. The circuits maintained by the intermediate brushes will vary by successively decreasing time periods considered from right to left. For each rotation of the disk 4, the circuits through all of the brushes 12 will be closed successively and will be maintained for successively decreasing time periods beginning for the longest period of closure with the brush 12 next to brush 12', and ending with the period of closure which is maintained shortest by the lowermost brush 12 just before the circuit through all of the brushes 12 is broken by brush 12' passing out of engagement with the conductor segment 8. As the secondary of the transformer of each welding machine is adapted to be connected through its multipoint switch $s'$, $s^2$, etc., with any one of the brushes 12, it will be apparent that any desired timed interval of current flow through the welders may be selectively determined at any or all of the welders by shifting the multi-point switch to the contact which is connected by a lead with appropriate brush 12, which is adapted to maintain a current flow for the given time period.

All of the welders may be operated by currents of the same duration, if the work requires such uniformity of action, or each of the welders may be operated under different time intervals of current flow. For example, considering the welder $w'$, if the arm of switch $s$ is moved into engagement with the uppermost of its multiple contacts, the circuit is closed through the timer by way of the lowermost brush 12, segment 8 and brush 12' to one side of the main, thence through the primary of the welder transformer and arm of switch $s'$ completing the circuit. But this circuit will be maintained closed only for the briefest timing interval of the master timer, namely, the time interval between the engagement of the lowermost brush 12 with segment 8, and the disengagement of brush 12' from segment 8. Similarly, if the arm of switch $s'$ is moved successively to the lower contacts, the circuits through the secondary of the transformer will be closed through brushes 12 successively higher in the series, and the time interval of flow of current will be successively increased. It will thus be seen that each welder is directly controlled from the master timer, and the particular time interval of current flow for each welder is selectively determined by the adjustment of the multi-point switch, s', for example, at the welder.

Instead of the particular connections shown in Fig. 1, between the individual welders and the master timer, the same results may be effected by providing each conductor leading from the master timer to a given welder, with a suitable form of connector coöperating with the binding post 13 of the brush studs 10, with means for readily attaching and detaching the connector from the binding post, so that said connector may be readily engaged with any one of the series of binding posts 13, and the connectors from any number of machines may also be connected with any given binding post 13. By this means, the connections to establish the desired time interval of current flow to any of the welders may be established at will at the master timer instead of at the welding apparatus, by means of the multi-point switch or selectro, such as s' shown in Fig. 1. This modified arrangement is necessarily simpler and cheaper to install, and would be of particular advantage in plants in which a given welder or series of welders would be operated for a considerable length of time upon one class of work requiring an invariable period of current flow for each weld.

What I claim is:—

1. The combination of multiple electric welders, timing mechanism therefor, comprising a contact device provided with means to maintain the welding current for successively varying time intervals, and means for selectively connecting the respective welders to said contact device in any desired timed relation.

2. The combination of multiple electric welders, timing mechanism therefor, comprising a rotary contact device having a series of brushes to make and break the main circuit at successively varying time intervals, and means for selectively connecting the respective welders to any of said brushes to regulate the duration of current flowing through said welders.

3. The combination of multiple electric welders, timing mechanism therefor, comprising a rotary contact segment, a series of brushes coöperating therewith to make and break the main circuit at successively varying time intervals, and conductors for connecting the respective welders with any selected brush, to regulate the duration of the current flowing through said welders.

4. The combination of multiple electric welders, timing mechanism therefor, comprising a casing, a rotary disk therein carrying a contact segment, a series of brushes coöperating with said disk and said segment to maintain the main circuit for successively varying time intervals, and means for selectively connecting the respective welders to said brushes.

In testimony whereof I affix my signature, in presence of two witnesses.

JOHN ALLEN HEANY.

Witnesses:
FRED. B. MACLAREN,
GUY WEBSTER.